May 23, 1950  J. M. TOWLER ET AL  2,509,177
SELF-ALIGNING JOURNAL BEARING
Filed Oct. 11, 1945  3 Sheets-Sheet 2
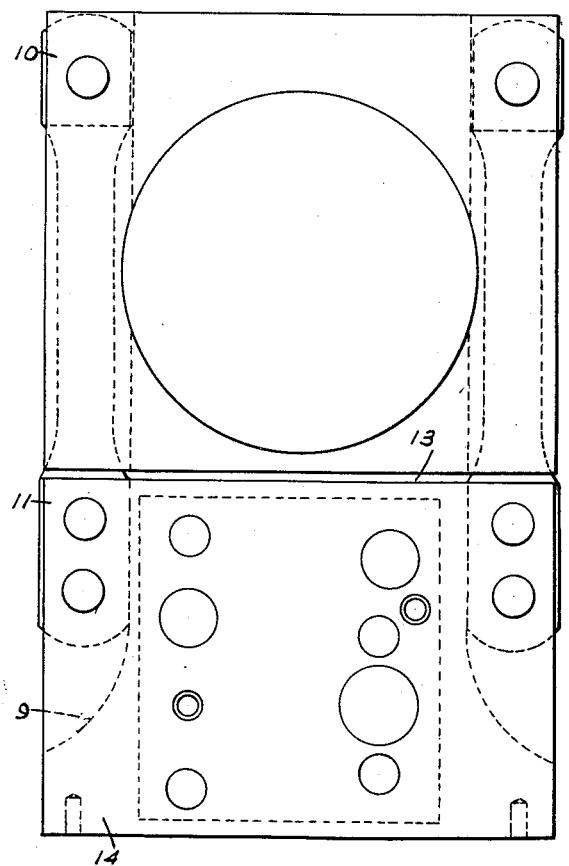
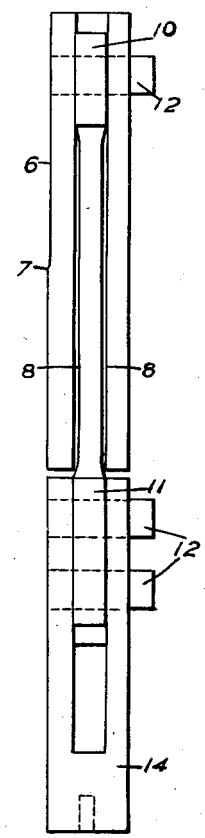

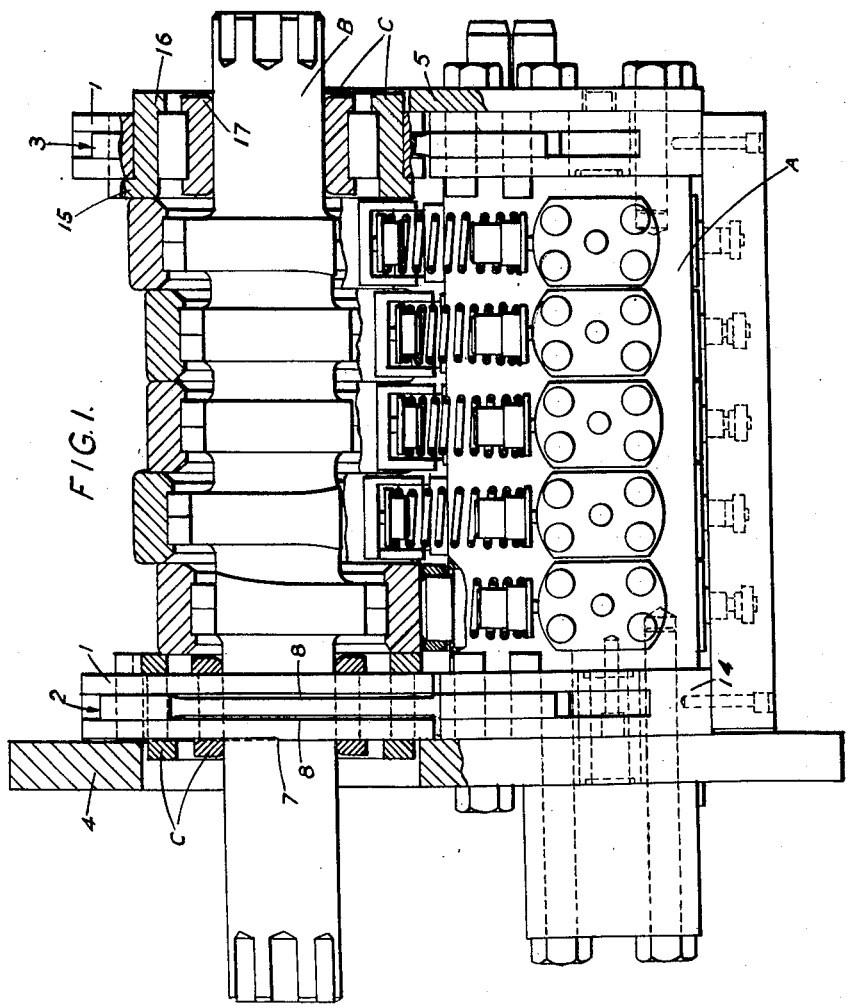

Patented May 23, 1950

2,509,177

UNITED STATES PATENT OFFICE 2,509,177

SELF-ALIGNING JOURNAL BEARING

John Maurice Towler, Harrogate, and Frank Hathorn Towler, Otley, England

Application October 11, 1945, Serial No. 621,722
In Great Britain October 20, 1944

7 Claims. (Cl. 308—26)

This invention relates to self-aligning journal bearings for high pressure reciprocating ram pumps.

The pump with which we are particularly concerned is designed to work at speeds up to 1500 reciprocations per minute and at pressure of 5000 lbs. per square inch and over and comprises three or more rams the pressure strokes of which are imparted by eccentric portions on a relatively short eccentric shaft through the medium of ball or roller bearings mounted directly upon said eccentric portions.

At the very high pressure under which these pumps work it is necessary to provide for a slight deflection at the centre of the eccentric shaft, for example, about ten thousandths of an inch, and this we have heretofore taken care of by mounting the ends of the shaft in journal bearings of the kind which are mounted in spherical housings so as to be self-aligning.

On our largest pumps we have found that these spherical housings take up too much room and are not readily adaptable to the compact construction of the pump.

An object, therefore, of the present invention is to provide self-aligning bearings having improved mountings which take up less room than is required by equivalent spherical housings.

In a self-aligning bearing according to the present invention each journal bearing, preferably of the ball or roller type, is mounted in a plain housing and these housings are supported by flexible links which give laterally under the strain imposed by the deflection of the eccentric shaft so as to permit the housings with their bearings to tilt and maintain the parallel relationship between the journal bearings and the shaft without excessive cross loading of the journal bearings.

In order that the invention may be clearly understood and carried into effect an example of the improved bearing of the present invention will now be described by aid of the accompanying drawings in which:

Fig. 1 is a part sectional elevation of a five throw reciprocating ram pump having self-aligning bearings according to the present invention.

Fig. 2 is a front view of a bearing assembled ready for attachment to one side of the pump body.

Fig. 3 is an edge view of Fig. 2.

Figure 4:
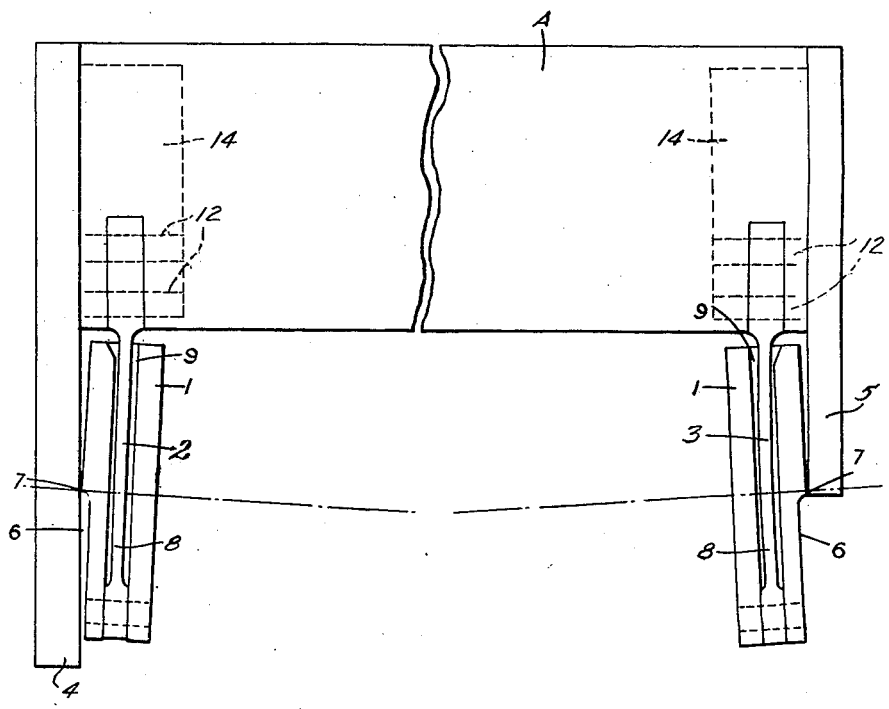
Fig. 4 is a diagram showing a pair of bearing mountings of the present invention functioning to align a pair of journal bearings during a deflection of the pump eccentric shaft said deflection being shown greatly exaggerated for the purpose of illustration.

In the drawings A represents the pump block or body, B the five throw eccentric shaft and C the shaft supporting journal bearings.

For the purpose of the present invention the journal bearings C have their outer races mounted in housings each consisting of a rectangular metal block 1 which is bored to receive the outer race of the journal bearing and is attached to the pump block A by a pair of flexible links 2 and 3, one at each side of the housing.

These housings are located between and normally maintain free contact with a pair of rigid side plates 4 and 5 affixed to the ends of the pump block. To permit the links 2 and 3 to deflect laterally under strain imposed by a deflection of the supported eccentric shaft B the outer face of each housing at 6 is machined to reduce its thickness from its outer end to a transverse line coincident with the axis of the eccentric shaft so that upon deflection of the eccentric shaft each housing is permitted to turn about a line contact constituted by the edge 7 (see Fig. 3) at the termination of the area of reduced thickness on each outer face of the housing and the contacting surfaces of the aforesaid rigid side plates 4 and 5.

The desired flexibility of the links may be obtained by suitably reducing their thickness over the portion 8 between their ends and utilising in their construction a metal of required strength and springiness such for example as 80/90 ton steel having a hardness of 420/360 Brinell.

To ensure perfect alignment between the parts of each bearing when assembled each housing may be machined from a solid rectangular plate of steel of the desired thickness and of a length sufficient to accommodate both the bearing housing proper and an extension equivalent in area to the side of the pump block to which it is adapted to be bolted. This one piece block is first bored through to receive the outer ring of one of the roller bearings. Slots 9 are then formed in each side edge of the block by milling to accommodate the links, and the ends of these links 10 and 11 which are of full thickness, are surface ground to fit closely within the aforesaid slots. Holes are then drilled through the housing block and the position links and reamed to receive dowels 12 for affixing the links by their ends within their slots. The links are then removed for machining the clearance at the outer face and outer end of the block to provide the aforesaid lateral edge 7 about which the housing may turn on deflection of the eccentric shaft. The block is then split at 13 into two portions by a lateral sawcut to form the housing 1 and a plate 14 by means of which the links are attached to the pump block.

The inner race of each roller bearing is a force fit on the eccentric shaft B and so that the outer race may be located axially it is provided on its inner side with an external circumferential lip or flange 15 adapted to abut against the inner face of the housing 1 and on its outer side with an internal circumferential flange 16 adapted to abut against the outer faces of the rollers which are located within an external circumferential U-shape groove in the laterally immovable inner race 17.

What we claim is:

1. A self-aligning bearing for reciprocating ram pumps of the character described comprising, in combination with a pump block, a housing receiving a journal bearing for the eccentric shaft of the pump, a member rigid with the pump block, and flexible links for connecting said housing to said member, each of said flexible links having a first portion fixed to said housing, a second portion fixed to said member and a third portion substantially contained in said housing, a clearance being provided within said housing to allow said third portion to yield laterally under the strain imposed by a deflection of said eccentric shaft, whereby to allow said housing to tilt and maintain parallel relationship between said journal bearing and said shaft.

2. A self-aligning bearing for reciprocating ram pumps of the character described comprising, in combination with a pump block, a metal block having a bore receiving a journal bearing for the eccentric shaft of the pump and at least two seats, a member rigid with the pump block, and a flexible member for each of said seats of said metal block, each flexible member having a first portion fixed to said housing and a second portion fixed to said rigid member, a clearance being provided between the part of each flexible member intermediate said first and second portion and the corresponding seat of said metal block to allow said part to yield laterally under the strain imposed by the deflection of said eccentric shaft whereby to allow said housing to tilt and maintain parallel relationship between said journal bearing and said shaft.

3. A self-aligning bearing for reciprocating ram pumps of the character described comprising, in combination with a pump block, a housing receiving a journal bearing for the eccentric shaft of the pump, a member rigid with the pump block, and flexible vertically elongated one-piece links for connecting said housing to said member, each of said flexible links having a first portion fixed to said housing, a second portion fixed to said member and a third portion substantially contained in said housing, a clearance being provided within said housing to allow said third portion to yield laterally under the strain imposed by a deflection of said eccentric shaft, whereby to allow said housing to tilt and maintain parallel relationship between said journal bearing and said shaft.

4. A self-aligning bearing for reciprocating ram pumps of the character described comprising, in combination with a pump block, a metal block having a bore extending transversely therethrough for receiving a journal bearing for the eccentric shaft of the pump and two vertically elongated seats on opposite sides of said bore, a member rigid with the pump block and having two vertically elongated seats registering with the seats of said metal block, and two flexible members, each flexible member having a first end portion fitting snugly in one of the seats of said metal block and rigidly attached thereto, a second end portion fitting snugly in a seat of said member and rigidly attached thereto and an intermediate portion substantially contained in a seat of said metal block and being of reduced thickness to produce a clearance allowing said intermediate portion to yield laterally under the strain imposed by a deflection of said eccentric shaft, whereby to allow said metal block to tilt and maintain parallel relationship between said journal bearing and said shaft.

5. A self-aligning bearing for reciprocating ram pumps of the character described comprising, in combination with a pump block, a housing bored to receive the outer race of a journal bearing for the eccentric shaft of the pump, flexible links for attaching said housing to the pump block, and a rigid plate affixed to the pump block adjacent said housing, the opposite faces of said rigid plate and housing being so shaped as to have portions contacting each other at all times, whereby upon deflection of said eccentric shaft, said housing is permitted by the flexibility of said links to turn about the contacting portions of said rigid plate and housing, whereby to maintain parallel relationship between said journal bearing and said shaft.

6. A self-aligning bearing for reciprocating ram pumps of the character described comprising, in combination with a pump block, a housing bored to receive the outer race of a journal bearing for the eccentric shaft of the pump, flexible links for attaching said housing to the pump block, and a rigid plate affixed to the pump block, said housing having its width reduced at the face thereof adjacent said rigid plate to provide a transverse edge coincident with the axis of said eccentric shaft, whereby upon deflection of the said eccentric shaft said housing is permitted by the flexibility of said links to turn about the line of contact of said edge with said rigid plate, whereby to maintain parallel relationship between said journal bearing and said shaft.

7. In a reciprocating ram pump of the character described, in combination with a pump block, two rigid side plates placed one at each end of the pump block, two housings respectively adjacent said side plates, each of said housings being bored to receive the outer race of a journal bearing for the eccentric shaft of the pump, two members rigid with the pump block and respectively underlying said housings, and flexible links for attaching said housings to said members, the opposite faces of each rigid plate and adjacent housing being so shaped as to contact each other at all times at least along a transverse line coincident with the axis of said eccentric shaft, whereby upon deflection of said eccentric shaft, said housings are permitted by the flexibility of said links to tilt in opposite directions turning about the lines of contact of said housings with said rigid plates, whereby to maintain parallel relationship between said journal bearings and said shaft.

JOHN MAURICE TOWLER.
FRANK HATHORN TOWLER.

REFERENCES CITED

The following references are of record in the file of this patent:

UNITED STATES PATENTS

| Number | Name | Date |
|---|---|---|
| 2,239,867 | Weckstein | Apr. 29, 1941 |